Figure 1:
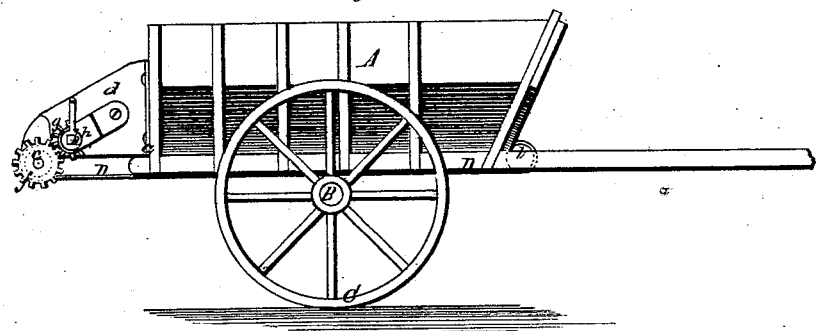
Figure 2:
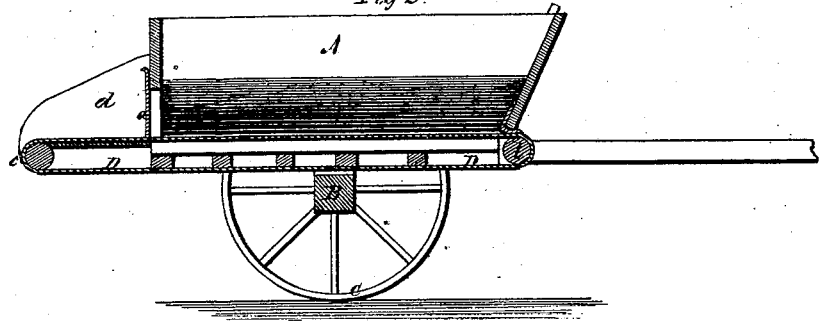

T. CROSSLEY & L. A. BERTOLETTE.
Unloading-Attachment for Carts.

No. 159,907. Patented Feb. 16, 1875.

WITNESSES.
Wm Garner
[signature]

INVENTORS
Thomas Crossley
Levi Albert Bertolette
per F. A. Lehmann
Atty.

THE GRAPHIC CO. PHOTO-LITH. 39 & 41 PARK PLACE, N.Y.

UNITED STATES PATENT OFFICE.

THOMAS CROSSLEY AND LEVI A. BERTOLETTE, OF WILMINGTON, DEL.

IMPROVEMENT IN UNLOADING ATTACHMENTS FOR CARTS, &c.

Specification forming part of Letters Patent No. 159,907, dated February 16, 1875; application filed January 23, 1875.

*To all whom it may concern:*

Be it known that we, THOMAS CROSSLEY and LEVI A. BERTOLETTE, of Wilmington, in the county of New Castle and State of Delaware, have invented certain new and useful Improvements in Cars, Carts, and Wagons; and we do hereby declare the following to be a full, clear, and exact description of the invention, such as will enable others skilled in the art to which it pertains to make and use it, reference being had to the accompanying drawings, which form part of this specification.

Our invention relates to an improvement in carts, cars, and wagons; and consists in an arrangement of parts by which the loose freight of a cart, car, or wagon, such as coal, sand, lime, grain, &c., can be discharged into a store-house, cellar, or vault without dumping, saving thereby labor and time, as will be more fully described hereafter.

The accompanying drawing represents our invention.

A represents the body of a car or cart, placed in the usual manner upon the axle B and wheels C. The front and sides slant inward, the latter beginning at about the middle of their height, the upper half being vertical, so that the bottom of the body is narrowed to about one-third of what it would have been had the sides been straight down to the bottom. The back part of the body of the cart is vertical, and has at the bottom a gate, $a$, of the width of the bottom of the cart, through which the load is discharged. The sides of the body A are supported by mortised standards, in the usual way. At the back part $b$ of the cart, and of a width equal to that of the gate $a$ is a chute, formed by extensions $d$, united by a bottom on a level with the bottom of the cart, in the ends of which is journaled the shaft of a roller, $c$, which shaft has upon one of its ends the wheel $f$, which gears with a pinion, $g$, upon the crank-shaft $h$. An endless belt, D, of the width of the bottom of the cart, passes over the roller $c$, entering the front and passing along the bottom of the cart, and out at the gate over a second roller, $l$, and thence under the cart. Endless chains, having suitable flanges or catches formed on top of the plates, as shown, may be substituted for the belt when coal or other such freight is to be carried, and toothed rollers at both ends exchanged for the smooth rollers.

When coal is delivered in cities, where it is prohibited to drive upon the sidewalks, it is dumped upon the sidewalks and in the gutters, whereby loss is incurred, and additional labor has to be employed to convey it into the vault or cellar, which may be very near, but out of reach of the cart. The coal has to be discharged where the cart is standing.

Many instances of a similar kind might be adduced to show the usefulness of the chute attached to the rear end of the cart, by means of which the cart may be discharged at places where a cart without one cannot reach.

Having thus described our invention, we claim—

1. A cart or wagon having a bed that is narrower at its bottom than its top, in combination with an endless belt, D, that passes through the whole length of the bed, substantially as set forth.

2. The combination of the bed A, having sloping sides, so as to be narrower at the bottom than the top, with the endless belt D, rollers $c\ l$, chute $d$, and wheels $g\ f$, substantially as specified.

In testimony that we claim the foregoing we have hereunto set our hands this 15th day of January, 1875.

THOMAS CROSSLEY.
LEVI ALBERT BERTOLETTE.

Witnesses:
V. E. HOLMES,
JAMES DOWNING,
EDMUND B. FRAZER.